United States Patent
Söderholm et al.

[19]

[11] Patent Number: 6,073,494
[45] Date of Patent: Jun. 13, 2000

[54] APPARATUS FOR MASS FLOW MEASUREMENTS WITH A WASTE ELIMINATING RING

[75] Inventors: Arne Söderholm; Olle Soderholm, both of Bromma, Sweden

[73] Assignee: S.E.G. Mekanik, AB, Amal, Sweden

[21] Appl. No.: 08/980,354

[22] Filed: Nov. 28, 1997

[30] Foreign Application Priority Data

Nov. 29, 1996 [EP] European Pat. Off. .............. 96850202

[51] Int. Cl.$^7$ ....................................................... G01F 1/82
[52] U.S. Cl. .................................. 73/861.354; 73/862.08
[58] Field of Search ....................... 73/861.353, 861.354, 73/862.08

[56] References Cited

U.S. PATENT DOCUMENTS

| | | | |
|---|---|---|---|
| 2,771,772 | 11/1956 | Kirwan ............................... | 73/861.354 |
| 2,771,773 | 11/1956 | Wallace . | |
| 2,832,218 | 4/1958 | White . | |
| 4,700,578 | 10/1987 | Fassbinder ......................... | 73/861.354 |
| 5,088,331 | 2/1992 | Fassbinder ......................... | 73/861.354 |
| 5,191,802 | 3/1993 | Fassbinder ......................... | 73/861.354 |
| 5,353,647 | 10/1994 | Toerner .............................. | 73/861.354 |
| 5,359,900 | 11/1994 | Hafner ............................... | 73/861.354 |

FOREIGN PATENT DOCUMENTS

92/08958  5/1992  WIPO .

*Primary Examiner*—Harshad Patel
*Attorney, Agent, or Firm*—Pillsbury Madison & Sutro LLP

[57] ABSTRACT

The present invention relates to an apparatus for measuring a mass flow of a fluent material using the Coriolis measuring principle. The apparatus comprises an inlet tube positioned and configured to allow the fluent material to flow therethrough and into the apparatus. An impeller wheel rotates about a rotational axis. A motor is operatively connected to the impeller wheel and rotates the impeller about the rotational axis thereof. The impeller wheel is positioned with respect to the inlet tube such that the fluent material flowing through the inlet tube into the apparatus flows into a central area of the impeller. The impeller has vanes that redirect the fluent material flowing from the inlet tube into the central area of the impeller in a generally radial direction away from the central area as the impeller is being rotated by the motor. A flow distributing device associated with the inlet tube is constructed and arranged to distribute the fluent material flowing through the inlet tube towards the central area of the impeller generally symmetrically about the rotational axis of the impeller. A waste eliminating ring is positioned between the inlet tube and the impeller. The waste eliminating ring prevents loss of the fluent material deflecting off the impeller back towards the inlet tube. A frusto-conical flange is positioned about the impeller. A spherical compliant bearing is connected to the impeller and resists radial movement of the impeller. A force transducer is operatively associated with the impeller and a flexible connecting element extending between the stator of the motor and the force transducer such that the connecting element transmits rotational movement of the stator to the force transducer.

5 Claims, 3 Drawing Sheets

APPARATUS FOR MASS FLOW MEASUREMENTS WITH A WASTE ELIMINATING RING

FIELD OF THE INVENTION

This invention relates to apparatus for measuring fluent material, i.e. for detecting the rate of flow of such material as delivered to and through the apparatus. By fluent material is meant particulated solids, liquids and semi-liquid or like substances having free-flowing characteristics. Examples of such material, which the apparatus of the invention is specially adapted to measure, are grain, flour, dry chemicals, other finely divided solids of powdered, granular or of similar character.

The present invention consists of a flowmeter of the type in which mass flow rate is made responsive to the Coriolis force. The particles to be measured are subjected to tangential acceleration is the a whirling impeller, the torque exerted on the vanes of the impeller in reaction from the Coriolis force accelerating the particles.

By measuring the torque and speed of rotation the flow is measured. Usually these values are transduced to electrical quantities. The flow is equal to torque divided by the axis speed of rotation which is trivial to do with today's technology. The time integral of the flow gives the total mass, which has past the impeller.

BACKGROUND OF THE INVENTION

An example of a known construction in this field is the U.S. Pat. No. 2,771,773. In a patent U.S. Pat. No. 2,832,218 the theoretical background is given and in patent EP 0 146 902 the deduction of the equation is included. The equation is the mass flow $q=M/n(R_2^2-R_1^2)$ where M=torque, n=axis speed of rotation, $R_2$=an outer radius of the impeller, and $R_1$=inner radius from which the particles or the flow meets the impeller surface at or around its centre.

BRIEF SUMMARY OF THE INVENTION

The principal object of the present invention is to minimize errors of measurement in a Coriolis flowmeter. Another object of the present invention is to provide a simple, reliable mechanical construction.

According to the equation above there are no correction constants which are depending on the properties of the material which is passing the impeller or on the shape of the impeller. However, the inner radius ($R_1$) is assumed to be a constant. That means that the particles are meeting the impeller at the same distance from the centre of the axis or just at the centre ($R_1=0$). When the material flow is coming down to the impeller, the particles are distributed over the impeller surface. If the inlet tube to the impeller is straight and long enough the distribution of the material particles probably will have a constant distribution even if the flow rate changes.

If the inlet tube happens to have a bent just near the impeller or if the material flow is pulsating because of coming from a screw conveyor, the inlet tube is not filled over the area and instead for instance following one side of the tube at a certain flow rate and gradually moving it's area-centre in the direction to the centre of the tube when the flow rate is increasing. Hereby, $R_1$ will change.

A method to reduce this measuring error is known from the U.S. Pat. No. 2,832,218 where two co-working impellers are used intended to be applied for a mass flowmeter for fluids. Because of the mechanical construction required, that principle is hardly applicable for dry solids.

It is the object of this invention to reduce the error from the changing flow distribution, to reduce other sources of errors coming up when handling the material and thereby almost eliminate traceable measuring errors of mass flow meters.

The device of the invention comprises an impeller on a shaft, which is driven by a motor, which rotary speed is measured. On the upper side of the impeller an inlet tube is ending. Inside this tube a flow distributing device is situated with the purpose of symmetrilizing or stabilizing the position of the fluid area of the fluid before it meets the impeller and keeping the distribution independent of the flow rate.

Around the center upper part of the impeller and around the outside of the end of the inlet tube a ring is placed to force all material to pass onto the impeller, thereby eliminating waste material. Around the impeller is placed a frusto-conical flange to govern the outflying particles to such directions so they not bounce back into the impeller, thereby being weighed twice.

The frusto-conical flange is provided with a springy or momentum-absorbing surface, thereby reducing granules to get broken.

The shaft is provided with a minimum of friction in its bearing, thereby minimising its interference on the torque measuring and the transmission of the torque to the force measuring transducer is optimised.

BRIEF DESCRIPTION OF THE DRAWINGS

The invention is described in FIGS. 1–8, in which.

DETAILED DESCRIPTION OF THE INVENTION

Figure 1:
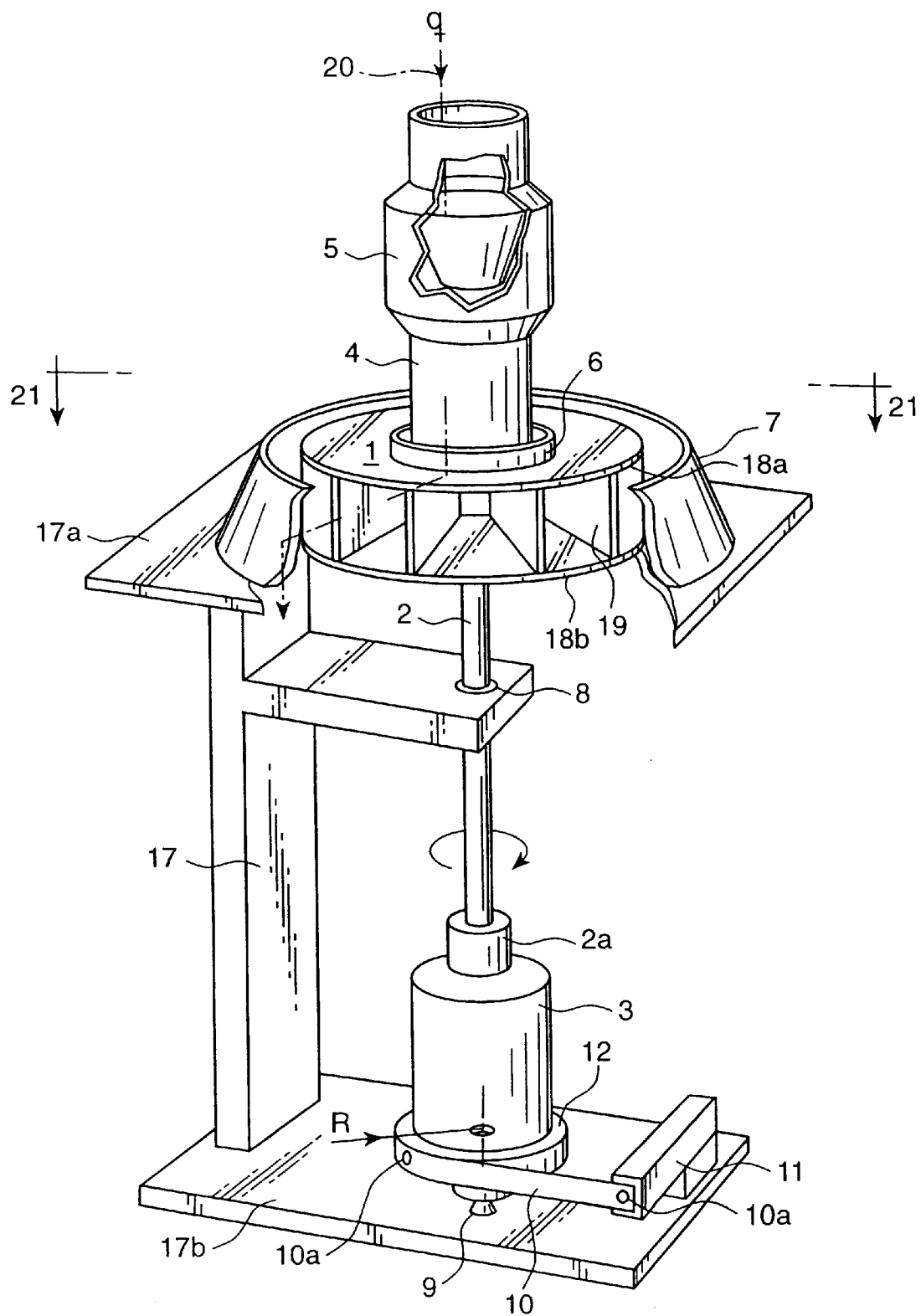
FIG. 1 shows a perspective view of the essential design of the apparatus according to the invention.

FIG. 1 shows the essential design of the device. The impeller wheel 1 with one upper plate 18a with a central hole, an under plate 18b and a number of vanes 19 between them is of known design. On the upper plate 18a is a ring 6 placed to prevent material spillage. The impeller 1 has a shaft 2 which is governed by the bearing 8 and in the spherical end of an axial bearing 9. The bearings are fastened to the frame 17 and resting against the foundation (17b). At the end of the axis the joint 2a is fastening the motor 3, which is mounted rotatable by the concentric roundel 12 with the radius R. Via a flat string or strip 10 the force measuring transducer 11 of known design is connected. The string or strip is to be flexible and is fastened in its ends by a pair of screws. The transducer is giving an electric output signal proportional to the force applied. In this application the signal is the torque on the impeller. Above the impeller is the inlet tube 4, the diameter of which is less than that of the ring 6 thereby eliminating the material to fly radially via the upper side of the upper plate. Inside the inlet tube 4 is a flow distributing device 5 situated. The way the material flow (q) through the flow meter is shown by the dotted line 20, where the radial direction along the impeller vanes 19 is the distance where the Coriolis force arise. Around the impeller is a frusto-conical flange 7 situated. The flange is fastened on shelf 17a on the frame 17. The flange breaks the material flow downwards and is collected in a funnel to an output tube (not shown). The cut 21—21 is a section through the impeller wheel shown in FIG. 2.

Figure 2:
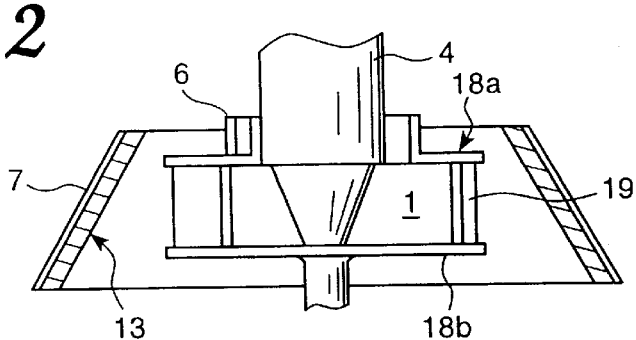
FIG. 2 shows a cut through part of FIG. 1.

FIG. 2 shows the details around the impeller 1. The impeller 1 and the inlet tube 4 are in the center of the figure and all around them is the frusto-conical flange 7, cut in this view, with a springy or momentum absorbing layer 13 to reduce the impact on the—material particle's thereby minimizing their bouncing back into the impeller and the granules to get broken.

Figure 3:
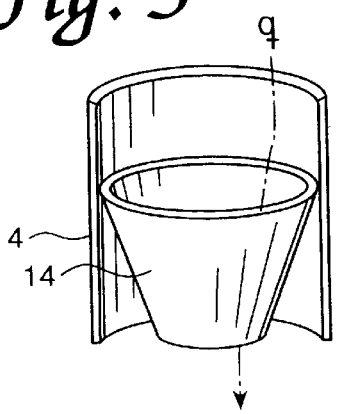
FIGS. 3–5 show examples of the force distributing device.
Figure 4:
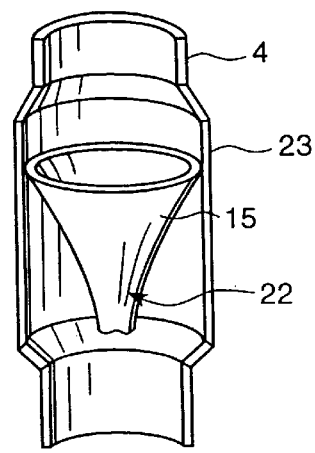
Figure 5:
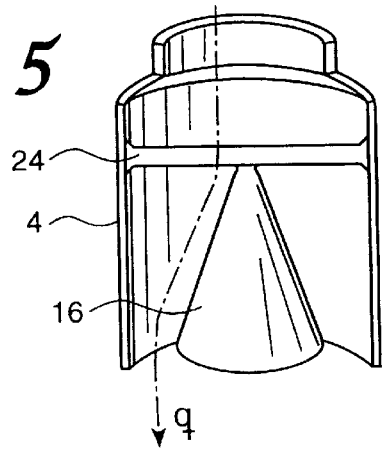

FIGS. 3–5 are examples of different designs of the flow distributing device 5.

FIG. 3 shows the principle of the distributing device 5 where the inlet tube 4 is cut so that the frusto-conical shaped insert 14 is seen. The material flow 9 is forced from the sides of the tube to its middle, thereby minimizing the changing of the centre of the distribution area of the material flow when hitting the impeller.

FIG. 4 is a variant of the construction of FIG. 3, but where insert 15 is made of a compliant material so the opening widen proportionally to the flow rate. The material is dovetailed 22 to get maximum of weakness. The inlet tube 4 is provided with an extended diameter 23 along the insert area to eliminate reduction of the flow rate maximum.

FIG. 5 shows contrary to FIGS. 3 and 4 a conically shaped insert 16 with its apex meeting the flow and thereby force the material to spread out along the sides of the inlet tube. The insert is fastened to a lath 24 extending through the tube.

Figure 6:
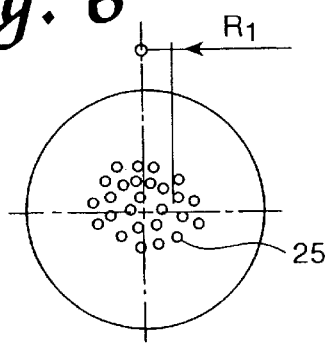
FIGS. 6 and 7 show examples of the flow distribution when the flow hit the impeller.
Figure 7:
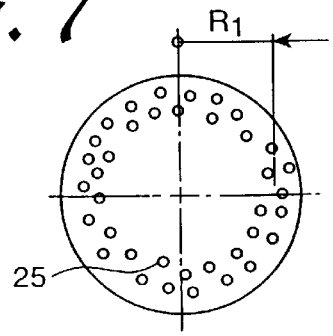

FIGS. 6 and 7 are views of how the material hit the impeller surface. The surface corresponds to the hole in the upper impeller plate 18a on FIG. 1. FIG. 6 corresponds to the circumstances illustrated in FIGS. 3 and 4 and shows how the material flow symmetrizes to the centre of the tube. The hit material area is marked with dots 25 and the average value of the radius $R_1$ will be short and almost constant. FIG. 7 corresponds to the circumstances illustrated in FIG. 5. The material is spread out to a ring around the walls of the tube and $R_1$ will get a larger value than in FIG. 6 but constant.

Figure 8:
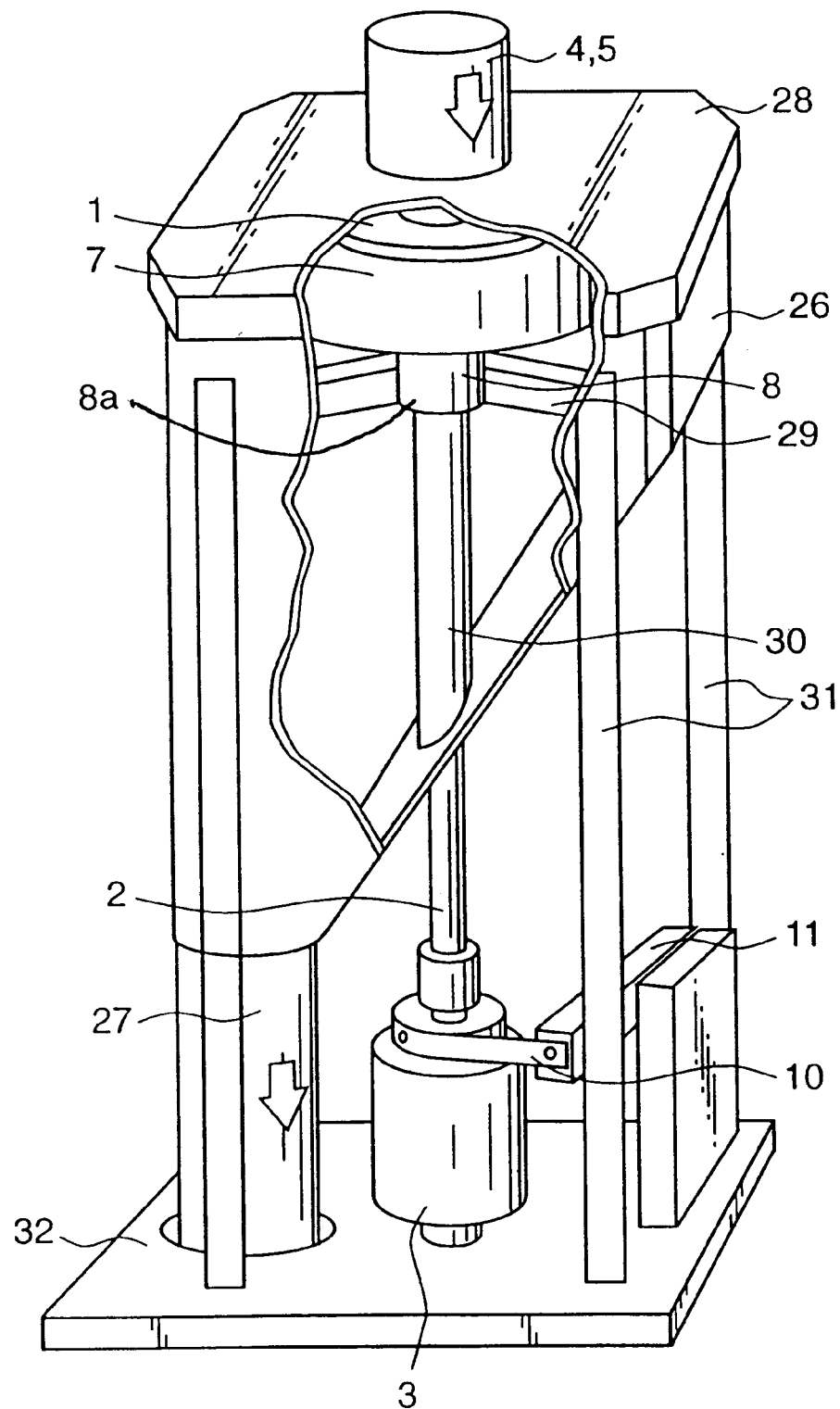
FIG. 8 is a schematic view of a complete flow meter embodying principles of the present invention.

FIG. 8 is a schematic view of the flow meter. The motor 3 with the torque measuring details are resting on the bottom plate 32 via the axial bearing 9. The funnel-shaped enclosure 26 is resting on pillars 31. In a cut out of the enclosure 26 is shown the bearing housing 8a for the shaft 2 with a surrounding protecting tube 30 and stays 29 for the bearing housing. The inlet tube 4 with the flow distributing device 5 inside (not shown) is resting on the lid 28. The outlet tube 27 is a part of the funnel-shaped enclosure 26.

We claim:

1. An apparatus for measuring a mass flow of a fluent material using the Coriolis measuring principle, said apparatus comprising:

an inlet tube through which the fluent material flows into said apparatus;

an impeller wheel having a shaft, said wheel and said shaft being mounted for rotation about a rotational axis;

a motor firmly coupled to the shaft of said impeller wheel, said motor being constructed and arranged to rotate said impeller wheel and shaft about said rotational axis;

said impeller wheel being positioned with respect to said inlet tube such that the fluent material flowing into said apparatus through said inlet tube flows into a central area of said impeller, said impeller having vanes that are constructed and arranged to redirect the fluent material flowing from said inlet tube into the central area of said impeller in a generally radial direction away from the central area as said impeller is being rotated by said motor;

a flow distributing device associated with said inlet tube, said flow distributing device being constructed and arranged to distribute the fluent material flowing through said inlet tube towards the central area of said impeller generally symmetrically about the rotational axis of said impeller;

a waste eliminating ring positioned between said inlet tube and said impeller, said waste eliminating ring being constructed and arranged to prevent loss of the fluent material deflecting off said impeller back towards said inlet tube, a frusto-conical flange positioned about said impeller, the inside of said flange being provided with a yieldable momentum-absorbing surface, said frustro-conical flange being positioned with respect to said impeller such that the fluent material being redirected in the generally radial direction by the impeller vanes contacts the yieldable momentum-absorbing surface of said flange so as to be directed downward by said flange;

a spherical compliant bearing connected to said impeller, said bearing being constructed and arranged to resist radial movement of said impeller, a force transducer operatively associated with said impeller, said force transducer being constructed and arranged to measure a torque being applied to said impeller;

an axial bearing device, said motor having a rotor and stator with the stator being mounted on said axial bearing device; and a flexible connecting element extending between said stator and said force transducer such that said connecting element transmits rotational movement of said stator to said force transducer.

2. An apparatus as defined in claim 1, wherein said flow distributing device consists of a funnel with a smallest opening thereof opening in the direction of the material flow.

3. An apparatus as defined in claim 1, wherein said flow distributing device is a funnel with a smallest opening thereof opening in the direction of the material flow, said funnel being formed from material that is elastic or compliant proportionally to the flow rate.

4. An apparatus as defined in claim 1, wherein said flow distributing device is a cone with an apex meeting the flow so that it spreads the material out along the sides of the inlet tube.

5. An apparatus as defined in claim 1, wherein the flexible connecting element is a flat strip connected to a cylindrical roundel concentric to impeller so that the strip runs along the exterior surface of said roundel and outwardly from said roundel in a tangential direction towards the measuring transducer.

* * * * *